United States Patent [19]

Shaughnessy

[11] Patent Number: 4,576,433

[45] Date of Patent: Mar. 18, 1986

[54] MEANS FOR CREATING RANDOM PATTERNS OF VARIEGATED LIGHT, AND LIGHT-REFLECTIVE MEANS THEREFOR

[76] Inventor: McKevin Shaughnessy, 359 Second St., Hoboken, N.J. 07030

[21] Appl. No.: 628,294

[22] Filed: Jul. 5, 1984

[51] Int. Cl.$^4$ ............................................. G02B 23/00
[52] U.S. Cl. .................................................... 350/4.1
[58] Field of Search ..................... 350/4.1, 4.2; 353/1, 353/2

[56] References Cited

U.S. PATENT DOCUMENTS

| | | | |
|---|---|---|---|
| 2,697,380 | 12/1954 | Wyser | 350/4.1 X |
| 2,757,570 | 8/1956 | Molnar | 350/4.2 X |
| 3,536,372 | 10/1970 | Beatty | 350/4.1 |
| 3,809,879 | 5/1974 | Gonzalez | 350/4.1 X |

FOREIGN PATENT DOCUMENTS 73389  9/1915  Switzerland ......................... 350/4.1

Primary Examiner—Richard A. Wintercorn
Attorney, Agent, or Firm—Bernard J. Murphy

[57] ABSTRACT

The invention is similar to a kaleidoscope, but substantially only as to its use. In the embodiment depicted and described, it comprises a cylindrical housing having a rotatable end cap journalled thereon, with a window or eyepiece at one end of the housing and an objective, disposed for viewing, in the rotatable end cap. The objective, however, is a single, variegated disc, and within the housing are light-transmitting rods which rotatably scan the disc and conduct light images from the objective toward the eyepiece. The images, albeit variegated, are asymmetrical rather than symmetrical (as in a kaleidoscope). Further, the inner wall of the housing has a layer of striated, light-reflective, plastic material thereon which, as the end cap is rotated, causes helical, cascading waves of variegated light to appear within the housing.

17 Claims, 5 Drawing Figures

U.S. Patent   Mar. 18, 1986   4,576,433
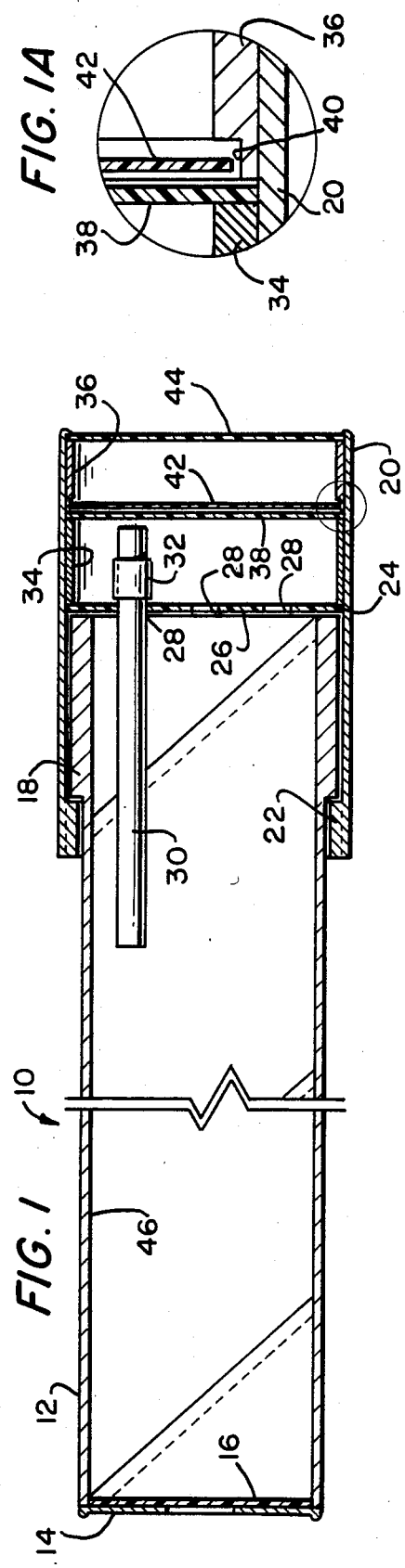
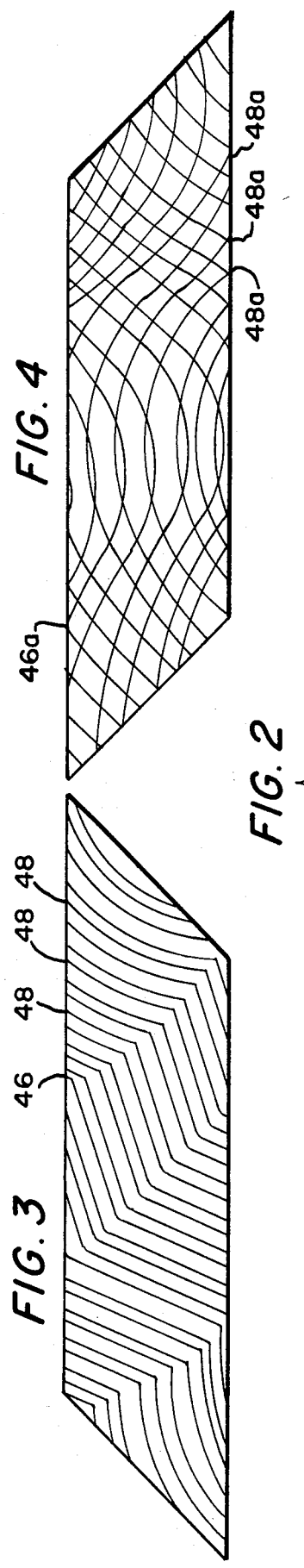
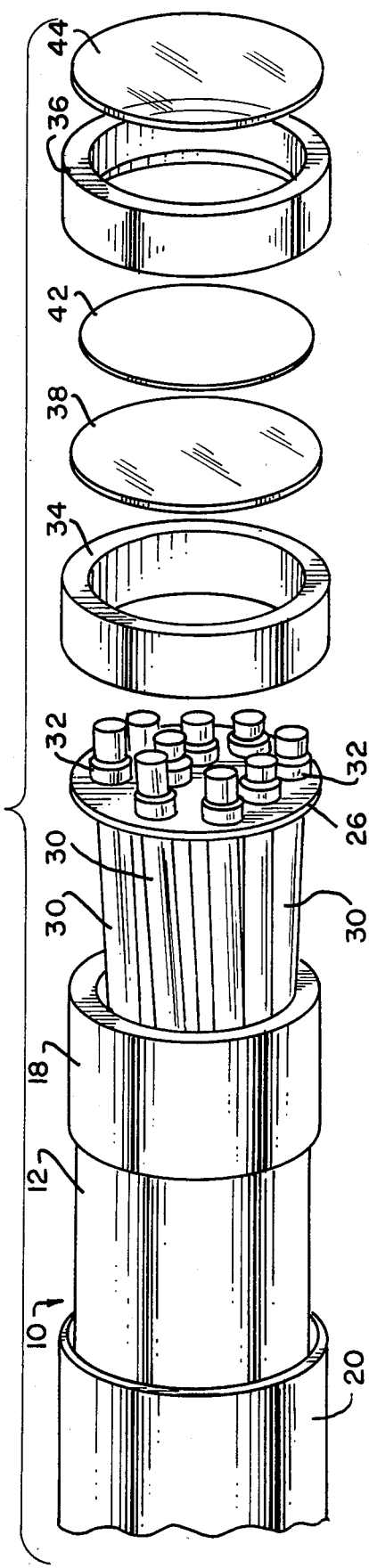

MEANS FOR CREATING RANDOM PATTERNS OF VARIEGATED LIGHT, AND LIGHT-REFLECTIVE MEANS THEREFOR

This invention pertains to that art concerned with kaleidoscopes, and similar such devices, which comprise means for creating recurring patterns of variegated light for viewing, and in particular to such a means which creates such patterns of an asymmetrical nature, and enhances the latter by further creating helical, cascading waves of variegated light which appear to depart from or to approach the viewer.

As noted, prior art devices, i.e., kaleidoscopes and the like, create recurring patterns of variegated light, but the patterns are always symmetrical in nature and, as a consequence, one can soon tire of the rather predictable geometric patterns, the beauty of the variegated patterns nothwithstanding. In addition, the bits of colored glass, which comprise the objective of the kaleidoscope, are the only source of visual imagery.

It is an object of my invention to set forth means for creating random patterns of variegated light, as well as light-reflective means therefor, which forms asymmetrical, non-geometric patterns, and such patterns supplemented with enclosing, helical, cascading waves of variegated light.

It is particularly an object of my invention to set forth means for creating random patterns of variegated light, comprising a housing having opposite ends; a transparent window set in one of said ends; a single, variegated objective movably disposed within said housing intermediate the ends thereof; and means confined within said housing, intermediate said objective and said window, for (a) close-proximity scanning of said objective, and (b) conducting variegated images of light from said objective toward said window.

Further objects of this invention, as well as the novel features thereof, will become more apparent by reference to the following description taken in conjunction with the accompanying figures in which:

FIG. 1 is a cross-sectional view, taken along the longitudinal axis thereof, of an embodiment of the invention shown in assembled condition;

FIG. 2 is an exploded view, in perspective, of the FIG. 1 embodiment;

FIGS. 3 and 4 are plan views of the novel, striated, light-reflective, films of plastic, according to two embodiments thereof, which are used to line the housing; and FIG. 1A is simply an enlarged detail of a portion of FIG. 1.

As shown in the figures, my novel means 10 comprises a cylindrical housing 12, one end, the viewing end thereof, having a metal, apertured cap 14 fixed thereto. Within the housing 12, and fixed across the aperture in the cap 14, is a disc 16 of clear plastic. The latter defines an eyepiece or window through which a user of the invention can observe the randomly created patterns of variegated light.

The opposite end of the housing 12 has a shoulder stop 18 formed thereon. The latter defines a limit-stop for an end cap 20 which is journalled on this opposite end of the housing 12. End cap 20 also has a shoulder stop 22 formed therewithin which slidably and roatatably engages the limit-stop or shoulder stop 18 of the housing 12. End cap 20 has an annular ridge 24 formed therein, and seated thereagainst, and held in postion by the threadjacent end of the housing 12, is an opaque, disc-shaped platform 26. Platform 26 has, in this embodiment of the invention, nine apertures 28 in which are accommodated nine light-conducting, clear plastic rods 30. Rods 30 have a somewhat free, oscillatory, slidable engagement with the platform 26, in that the apertures 28 are generously larger than the diameter of the rods 30. To retain the rods 30 in place, i.e., to prevent their dislodgement from the platform 26 and deposit at the eyepiece end of the housing 12, each has a collar 32 of transparent tape fixed thereabout.

End cap 20 has a pair of spacers 34 and 36 set therewithin, slightly spaced apart, the spacing providing an annular groove in which is accommodated a clear, plastic disc 38. The end of spacer 36 which is adjacent to the disc 38 has an annular step formed therein. This latter step 40 defines a retainer for a variegated disc 42. Disc 42 has a diameter which is smaller than that of the step 40, yet not smaller than the inside diameter of the remainder of spacer 36. Hence, upon the end cap 20 being turned on the housing 12, disc 42 is free to roll within the end cap 20, but is kept within the groove between the spacers 34 and 36.

Disc 42 is a translucent plastic article, comprising the objective of the means 10, and has thereon patches of varied colors. Disc 38 is provided simply to protect disc 42 from scoring, and to insure that the thereadjacent ends of the rods 30 do not contact disc 42. Finally, spacer 36 receives an outermost, frosted plastic disc 44; the end of the end cap 30 is turned inwardly to sandwich and retain the disc 44 in position.

The ends of the rods 30 which are in close proximity to disc 38 have a dull, lusterless finish, and the opposite ends of the rods have a highly-polished, lustrous finish. Upon the end cap 20 being turned on the housing 12, the dull ends of the rods scan portions of the variegated disc 42, and conduct the colors which are scanned to the lustrous ends, and present the nine, discrete color images to the eye of a viewer using the eyepiece or window, i.e., disc 16.

Light admitted through disc 44, from a source thereof, passes through the variegated disc 42, and the diverse colors are impressed on the dull ends of the rods 30 for display at the lustrous ends of the rods. The colors viewed on the lustrous ends of the rods 30 are not sharply defined, due to the dull finish of the scanning ends of the rods 30. Rather, what is viewed is a montage of blending, changing, moving and filmy images. As noted, the viewed images move, and this proceeds from fact that, with the rotation of the end cap, the rods 30 generally nutate or flop around within the housing 12. The platform 26 rotates with the end cap 20, and the rods 30 randomly displace as a consequence thereof. Simultaneously, the variegated disc 42 is rolling within the end cap, changing its relative positioning, then, within the end cap. The viewer sees a plurality of multicolored images which constantly change, move toward and away from each other, and appear to be in near adjacency to the viewer's eye.

To enhance the variegated images which can be viewed, it is a teaching of my invention to line the inner wall of the housing 12 with a layer 46 of light-reflective material. In this embodiment of the invention, layer 46 comprises a film of light-reflective plastic which is marketed under the trademark Mylar. While it is known to have a light-reflective wall in kaleidoscopes, my teaching goes beyond this. Layer 46 is striated, and it has no axially-directed juncture or overlay. In FIGS. 3 and 4 are depicted two embodiments of layers such as are useful in the means 10. Layer 46 in FIG. 3 has the grooves or channels of striae 48 formed in the underside, or non-reflective side of layer 46, and the striae 48, while here arcuate, and there linear, are generally parallel, and no striation crosses another thereof. Layer 46a in FIG. 4 has the grooves or channels of striae 48a in the reflective side thereof, and the channels or grooves take the form of parallel and opposed sine waves, each channel or groove crossing another thereof at a plurality of locations.

These layers 46 and 46a or films of light-reflective plastic are formed into parallelograms which have no right-angular corners. This is done so that they may be rolled into cylindrical forms which present no axially-directed juncture or overlay. The juncture or overlay, then, is of helical conformation. As shown in FIG. 1, the overlying edges of the layer 46 is directed toward the end cap 20 so that, upon one looking in through the disc 16, the overlays will be obscured or invisible.

The striae 48 (or 48a) produce a remarkable, unexpected visual effect. With disc 44 directed toward a source of light, and upon the end cap 20 being turned, a viewer will see the aforesaid montage of blending, changing, and moving multicolored images, via the lustrous ends of the rods 30. Additionally, however, there appear helical, cascading waves of variegated light in circumscription of the montage. The light admitted into the housing, and passing through the discs 44, 42, 38 and traveling along the rods 30, plays on the striae 48 and creates the noted cascading waves. They appear to travel in suspension within the housing 12, cycle about the central, variegated montage, as though emanating from the periphery of the montage.

FIG. 2 is illustrative of the assembly of the novel means 10. The striated film layer 46 is formed into a cylinder and placed inside of the housing 12, and the end cap 20 is slid onto the eyepiece end of the housing. The end cap 20 is brought up to the shoulder-stop 18, then the platform 26, with the rods 30 therein is set against the end of the housing 12. Next, spacer 34 is set in place. Discs 38 and 42 are inserted into the end cap 20, then the spacer 36 is set in place. Disc 44 is placed against spacer 36, and finally the end of the end cap 20 is turned over to secure disc 44.

While I have described my invention in connection with a specific embodiment thereof, it is to be clearly understood that this is done only by way of example, and not as a limitation to the scope of my invention as set forth in the objects thereof and in the appended claims.

I claim:

1. Means for creating random patterns of variegated light, comprising:
    a housing having opposite ends, with an end cap rotatably journalled on one of said ends;
    a transparent window set in one of said ends;
    a single, variegated object movably disposed within said housing intermediate said ends thereof; and
    means confined within said housing, intermediate said object and said window, for (a) close-proximity scanning of said object, and (b) conducting variegated images of light from said object toward said window; wherein
    said end cap has an annular surface therewithin which has a given inside diameter;
    said object comprises a circular disc;
    said object is confined within said annular surface; and
    said object has an overall diameter of less than said given inside diameter and, consequently, freely rolls upon said annular surface coincident with rotation of said end cap.

2. Means, according to claim 1, wherein:
    said scanning and conducting means comprises means for conducting such light images along discrete paths within said housing.

3. Means, according to claim 2, wherein:
    said discrete-paths images-conducting means comprises a plurality of light-conducting rods.

4. Means, according to claim 3, further including:
    a platform, confined within said housing, for supporting said rods.

5. Means, according to claim 1, further including:
    means at the other end of said ends of said housing for exposing said object to a source of light.

6. Means, according to claim 5, wherein:
    said object is translucent.

7. Means, according to claim 4, wherein:
    said platform comprises means defining an opaque light barrier, and is fixed within said housing intermediate said ends thereof.

8. Means, according to claim 3, wherein:
    common, first ends of said rods are lusterless;
    common, other ends of said rods are lustrous; and
    said first ends of said rods are in close proximity to said object.

9. Means, according to claim 4, wherein:
    said housing comprises means for rotating said platform to cause said first ends of said rods circularly to scan said object.

10. Means, according to claim 1, wherein:
    said housing has an inner, circumscribing wall; and further including
    a layer of light-reflective material lining said wall.

11. Means, according to claim 10, wherein:
    said material comprises a film of light-reflective plastic; and
    said plastic material has striae formed therein.

12. Means, according to claim 11, wherein:
    none of said striae traverse any others thereof.

13. Means according to claim 11, wherein:
    each of said striae traverses a plurality of others thereof at a plurality of locations.

14. For use in combination with means for creating random patterns of variegated light, which means comprises a walled, dual-ended housing having (a) a window in one end of said housing, (b) a variegated object within the housing, and (c) means within the housing for scanning said object and conducting images of light therefrom toward said window, light-reflective means for lining the wall of the housing, comprising:
    a film of light-reflective plastic; and wherein
    said plastic has striae formed therein.

15. Light-reflective means, according to claim 14, wherein:
    none of said striae traverse any others thereof.

16. Light-reflective means, according to claim 14, wherein:
    each of said striae traverses a plurality of others thereof at a plurality of locations.

17. Light-reflective means, according to claim 14, wherein:
    said film defines a parallelogram having all corners thereof of non-right-angular conformation.

* * * * *